Oct. 11, 1938.  L. BODDY  2,133,077
ELECTRICAL INDICATOR
Filed Sept. 15, 1936  2 Sheets-Sheet 1

LEONARD BODDY, INVENTOR.

BY Slough & Canfield

ATTORNEYS

Oct. 11, 1938.  L. BODDY  2,133,077

ELECTRICAL INDICATOR

Filed Sept. 15, 1936  2 Sheets-Sheet 2

LEONARD BODDY, INVENTOR.

BY Slough & Canfield

ATTORNEYS

Patented Oct. 11, 1938

2,133,077

UNITED STATES PATENT OFFICE 2,133,077

ELECTRICAL INDICATOR

Leonard Boddy, Ann Arbor, Mich., assignor to The Anderson Company, Gary, Ind., a corporation of Indiana Application September 15, 1936, Serial No. 100,918

4 Claims. (Cl. 200—122)

This invention relates to electrical indicating systems and apparatus, and more particularly to the transmitting or sending units of such apparatus.

I am familiar with electrical indicating systems comprising a transmitter or sending unit disposed at the point of manifestation of a physical force such as temperature, pressure, or liquid head and an indicating unit at a point remote from the transmitting unit but connected in circuit therewith whereby an indication of the variation in the physical force is indicated through corresponding variations in current value transmitted to the indicating unit.

One such type of transmitter is illustrated in a patent to T. J. Smulski, No. 2,006,608, issued July 2, 1935 wherein the relative warping of associated bimetallic elements under thermal change is adapted to cause a series of current pulsations which may be transmitted to a suitable indicating unit such as the type illustrated in a patent to T. J. Smulski, No. 2,022,441, issued November 26, 1935.

These instruments are primarily adapted to automotive vehicles wherein it is desired to use a minimum amount of current and the apparatus parts must be extremely sensitive. Due to the operating requirements of the parts employed, and the variations in material and necessary tolerances encountered in commercial production, I have found that considerable variation in indication of a given condition will result unless adjustment means are provided. The present adjustment and calibrating means required are relatively involved and require considerable time for accurate adjustment.

Additionally, due to the sensitiveness of the operating parts particularly when placed on an automotive vehicle which is normally subjected to considerable vibration, the manner of mounting of the parts of the mechanism is extremely important.

I have disclosed in the present application an indicating system of the above type and particularly a transmitting unit which is susceptible of efficient and economical manufacture, which may be quickly and accurately adjusted and calibrated, and the parts of which are mounted so as to be relatively uninfluenced by vibration commonly found in automotive vehicles.

It is a primary object of my invention therefore to provide a transmitting unit adapted to electrical indicating systems which can be simply and economically manufactured in quantity production.

Another object of my invention is to provide a transmitting unit adapted to electrical indicating systems which can be quickly and accurately adjusted and calibrated.

Another object of my invention is to provide a transmitter adapted to electrical indicating systems having the parts mounted so as to be relatively uninfluenced by vibration and the like.

Another object of my invention is to provide a transmitter for electrical indicating systems which can initially be accurately adjusted and calibrated, which is relatively uninfluenced by temperature variation, and which will continue giving accurate indication over a long period of use.

Another object of my invention is to provide an electrical indicating system having a simple and efficient transmitter, and wherein a major portion of the transmitter parts are adaptable as a unit to transmitters of different types such as liquid level, oil pressure and the like.

Other objects of my invention and the invention itself will become increasingly apparent with a consideration of the following description and drawings wherein.

Figures 1, 2:
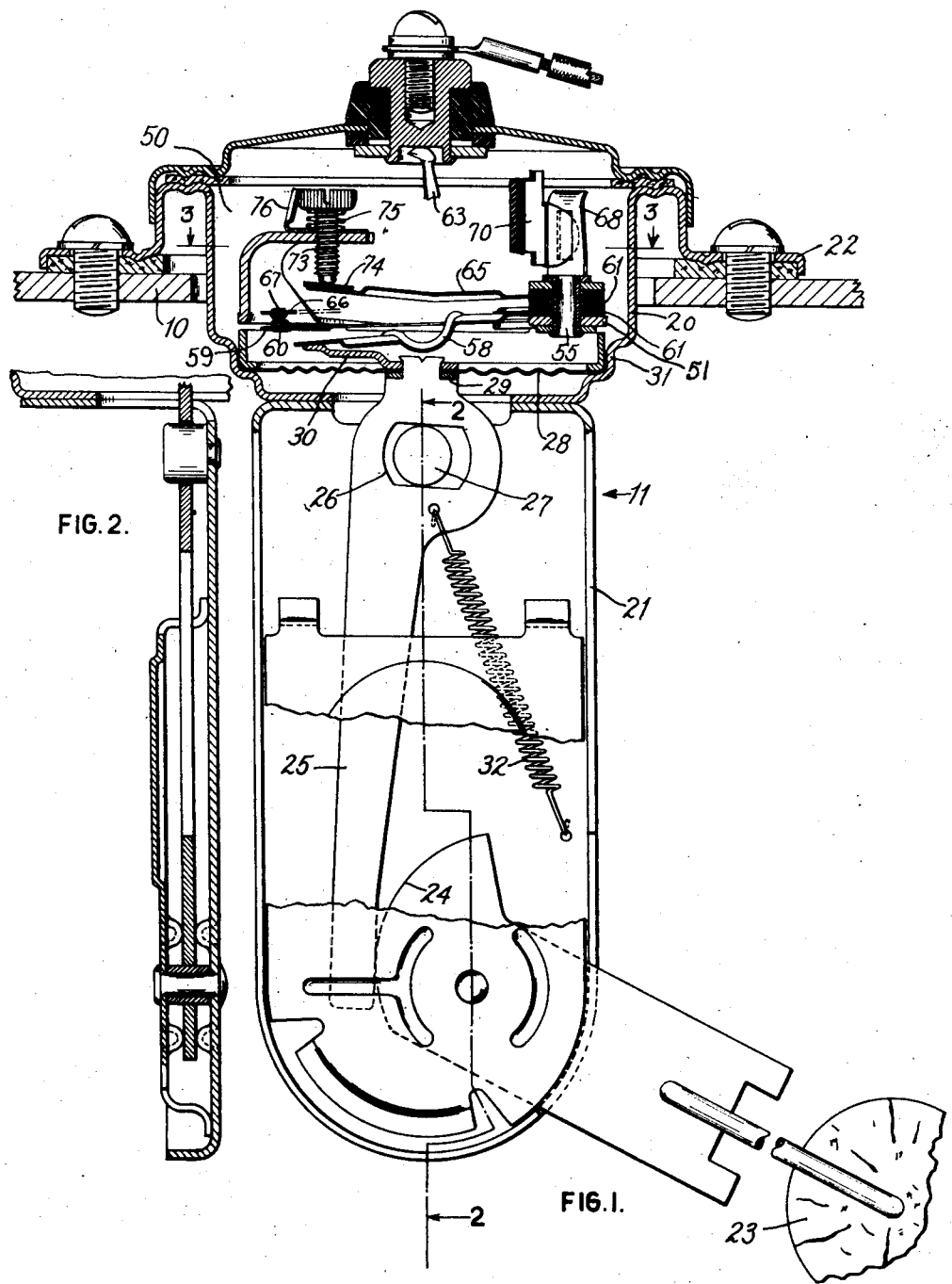
Fig. 1 is an elevational view partially in section of a transmitter embodying my invention.
Fig. 2 is a section taken along the line 2—2 of Fig. 1.
Figure 3:
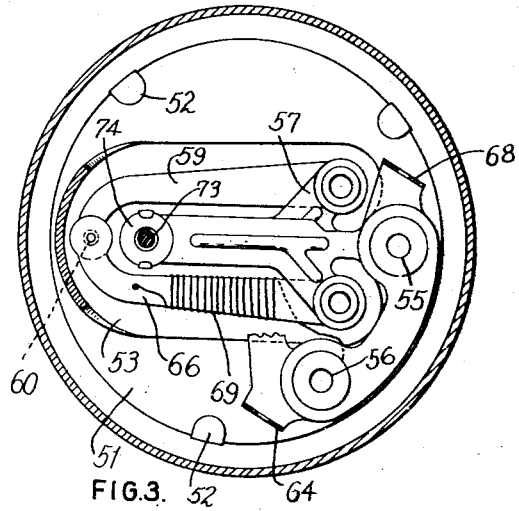
Fig. 3 is a section taken along line 3—3 of Fig. 1.
Figure 4:
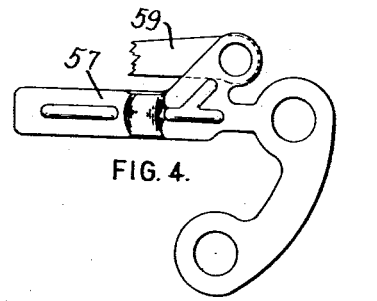
Figs. 4 and 5 are elevational views of parts of the transmitter of Fig. 1.
Figure 5:
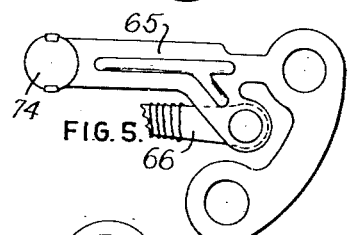

Referring now to the drawings, I have indicated generally at 10 the top wall of an automotive vehicle gasoline tank or similar liquid container on which is mounted a transmitter unit generally indicated at 11, the transmitter being connected through a wire 12 with an electro-responsive indicator 13 which is connected by grounds indicated at 16 and 17. The manner of wiring an electrically operable indicating system of this type is well known and a further description is not believed necessary.

The electro-responsive indicator 13 may be of any well known type which is actuated either by intermittent current pulsations or by a continuous current of varying intensity. The transmitter 11 comprises an enclosed housing portion 20 and a depending generally channel-shaped arm 21. The container wall 10 is perforated and the arm 21 and a portion of the housing is projected therethrough, the housing being provided with a radially outwardly extending flange 22 riveted or otherwise secured to the container wall 10. The arm 21 pivotally supports a float element 23 whereby the float element will be relatively rotated in response to variation in liquid level.

As best illustrated in Fig. 1 the inner end of the float element 23 comprises a camming face 24 adapted to actuate a generally vertically disposed lever 25. The lever 25 adjacent its upper end is provided with an elongated perforation 26 having substantially parallel sides for the reception of a pin 27 rigidly secured to depending arm 21. The upper end of lever 25 is secured to a diaphragm 28, the diaphragm being provided with a central perforation within which is secured, in a suitable manner as by soldering, a metal washer 29, the washer being slotted whereby a neck portion of lever 25 may project upwardly therethrough and also through an operating arm 30 which is soldered or otherwise secured to the diaphragm 28. The neck portion of lever 25 is then flanged over whereby the lever and arm 30 are rigidly interconnected with each other and with the diaphragm, and movement of lever 25 will correspondingly move arm 30.

The diaphragm is provided with an upstanding peripheral flange and is adapted to be seated within and secured by soldering or the like to a generally cup-form portion 31 of the housing. The housing portion 31 has a perforated base permitting the lever arm to be projected therethrough and since the pin 27 prevents longitudinal movement of lever 25 it is constrained to rock about pin 27 under lateral movement of the lowermost end of the lever effected by the camming face 24 of the float element.

A spring 32 is secured to the lever 25 adjacent the perforation 26 and to the depending arm 11 laterally of the point of attachment to the lever whereby there will always be a tendency to rotate the lever in a counter-clockwise direction as viewed in Fig. 1 insuring that the lever will always be maintained in contact with the camming surface of the float element 23 and the float in contact with the liquid surface.

It will now be understood that when the container is substantially filled with liquid that the float element will be in a substantially horizontal position or the float will be above the point of support of the float element and the camming surface thereof will rock the lever 24 laterally to a considerable degree and in turn the associated operating arm 30 will be rocked so that its free end moves upwardly. As the liquid level within the container decreases, the degree through which the lever 24 is rocked decreases and the free end of arm 30 has a definite position corresponding to a given liquid level and in a manner to be later described this controls the current passing through the transmitter to the indicating unit 13.

Figure 7:
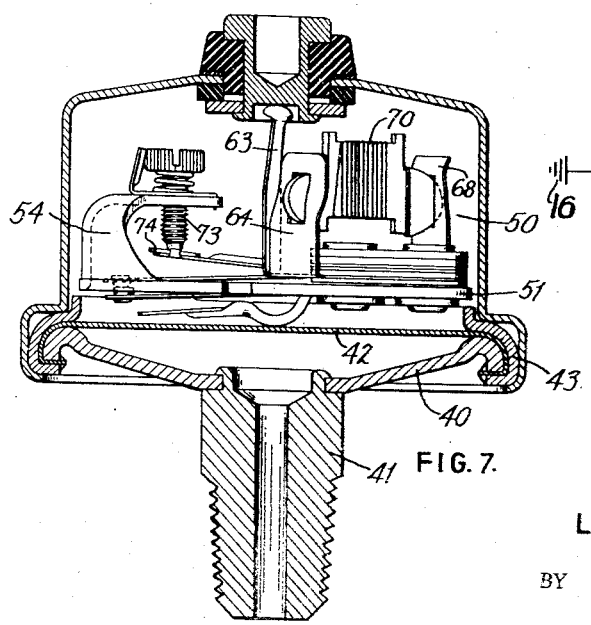
Fig. 7 is a modified form of transmitter.

Fig. 7 illustrates a transmitter adapted to be included in a system to indicate fluid pressure, such as oil pressure, the arrangement being similar to that described for indicating liquid level with the exception that a diaphragm directly transmits movement rather than through an operating arm. A housing adapted to be mounted at or adjacent the oil pump comprises a relatively shallow cup member 40 having a centrally disposed externally threaded stem 41 permitting the housing to be sealingly secured at the oil pump or a convenient place in the oil conduit line. The stem is centrally bored for entry of oil to the housing interior. The cup element 40 has an axially extending peripheral flange about which is disposed a relatively flexible diaphragm 42 secured by spinning a ring element 43 therearound and soldering the diaphragm and ring member to the cup member.

It will now be understood that the central portion of diaphragm 42 will assume a definite position corresponding to a given pressure and can transmit movement axially thereof in response to changes in oil pressure.

A transmitter unit generally indicated at 50 is adapted to send a series of current pulsations through the circuit of the system proportional to movement of an element associated therewith and which movement is effected by the operating arm 30 of the liquid container transmitter or the diaphragm 42 of the oil pressure transmitter. The operation of the transmitter unit 50 will now be described.

The unit 50 comprises a circular plate 51 adapted to be inserted within the housing cup portion 31 of the liquid container transmitter and adapted to be gripped by fingers not shown. In a similar manner the unit is adapted to be mounted in the oil pressure transmitter by being disposed within the ring element 43 and gripping plate 51 by similar fingers 52. The plate 51 is provided with a relatively large and generally rectangular perforation 53 and is also provided with an upstanding arm 54 for a purpose to be later described. Two spaced tubular pins 55 and 56 project upwardly from the plate and telescoped over the pins is a copper or the like resilient element 57 having an arm projecting into the plate perforation 53, the arm being bent downwardly generally centrally thereof to provide a U shaped abutment 58. The element 57 is provided with a lateral extension to which is rigidly secured a bimetallic strip 59 by an end thereof, the opposite end of the strip 59 being curved toward a median line of plate 51 and having a contact 60 on its upper face. A perforated insulating strip 61 is placed above element 57 and above the strip 61 is a contact member 62 formed of copper or the like and having an upstanding contact 63 and an upstanding perforated arm 64.

Superposed on the member 62 is a second insulating strip 61 and an element 65 formed of copper or the like and having an arm projecting outwardly into the plate perforation 53, the arm having a lateral extension to which is rigidly secured a bi-metallic strip 66 similar to strip 59 but opposite hand, having a contact 67 on its lower face. An upstanding perforated arm 68 either integral with element 65 or in contact therewith is also disposed above the second insulating strip 61.

A third insulating strip 61 and a similarly formed metal plate are then telescoped over pins 55 and 56 and the pins are staked or flanged over to firmly mount the above described parts on plate 51.

An insulated wire encircles the bimetallic strip 66 forming a heating coil 69, one end of the wire being soldered or otherwise suitably secured to the strip 66 and the opposite end contacting member 62, the heating coil being adapted in a manner to be later described to be variably heated to warp the strip 66 and cause the contact 67 to be moved in correspondence with the current heating value.

Figure 6:
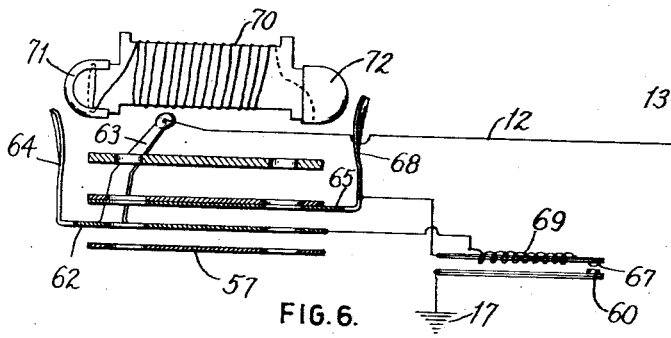
Fig. 6 is a diagrammatic view of an indicating system embodying my invention.
Figure 8:
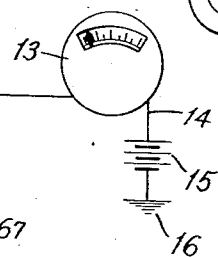
Fig. 8 is a circuit diagram with parts illustrated in conventional form.

A shunt unit 70, best illustrated in Fig. 6, comprises a fibre strip encircled by a plurality of turns of wire with the wire ends engaging terminals 71 and 72 slipped over the strip ends. The shunt unit is adapted to interconnect arms 64 and 68 by projecting the terminals 71 and 72 through the arm perforations whereby current may be shunted around heating coil 69 in a manner and for a purpose to be later described.

The upstanding arm 54 of plate 51 has a horizontally extending portion provided with a threaded perforation for the reception of an adjusting screw 73, the lower end of the screw abutting the free end of the arm of element 65 but insulated therefrom by a fibre pad 74 secured on the arm. Rotation of screw 73 will raise or lower the arm which resiliently abuts the screw end and consequently raise and lower the bi-metallic strip 66 to alter the relative position of contacts 60 and 67. To maintain the screw 73 in an adjusted position I provide a compression spring 75 intermediate the screw head and arm 54 of plate 51 and also provide a resilient clip having a finger 76 engaging a preferably knurled surface of the screw head. The clip is maintained in place by projecting the screw 73 therethrough and forming a lip thereon to engage a slot in arm 54.

The operation of the transmitter will now be described. If the transmitter unit 50 is in the liquid level indicating system the operating arm 30 will engage abutment 58 of element 57 and if employed on the pressure indicating system the diaphragm 42 will engage the abutment but in either case the substantially vertical movement of abutment 58 will correspond to the height of the liquid in the container or the intensity of the pressure.

The bi-metallic strip 59 and its contact 60 will be correspondingly moved and contact 60 will variably press against contact 67 permitting current to traverse the heating coil tending to cause the bi-metallic strip 66 and contact 67 to move away from contact 60 and break the circuit. The length of time required for separation of the contacts will depend on the pressure between the contacts and since a current impulse of this duration will be transmitted to the indicating unit 13 it will measure the liquid level or pressure. If the voltage increases the contacts will separate more quickly but a current impulse of greater value will be transmitted so that the cumulative value of the current impulse in a given short interval will be substantially constant despite voltage variation.

In calibrating the transmitter it is necessary to correct the range to correspond with the indicating unit minimum and maximum readings since the empty float position or minimum pressure position can be checked by adjustment of the indicating unit arm. The transmitter is connected substantially as illustrated in Fig. 6 and the reading with the shunt unit omitted is checked on a master indicating unit and which will normally underread. Shunt units of varying resistance are available and one is selected which will cause the indicating unit to slightly overread and this over-reading can be quickly corrected by adjustment of screw 73. Thus a transmitting unit is provided which can be quickly and easily calibrated and in which the operating parts although sensitive in operation are securely mounted so as to be relatively unaffected by vibration.

Although I have shown and described modifications of my invention, I contemplate that numerous and extensive departures may be made therefrom without departing from the spirit of my invention and the scope of the appended claims.

Having thus described my invention, what I claim is:

1. An electric circuit controller comprising a support, an arm fixed to the support at one end and having a freely movable portion, a thermally responsive element supported at one end by the arm and bodily movable therewith, the thermally responsive element having an opposite end portion movable responsive to thermal change and adapted to form an electric contact, a second arm fixed to the support at one end and having a freely movable opposite end, a second thermally responsive element supported at one end by the second arm and bodily movable therewith, the opposite end of the second thermally responsive element being movable upon thermal change and being adapted to contact the first thermally responsive element to complete an electric circuit, both thermally responsive elements being substantially equally responsive to thermal change to compensate for ambient temperature variations, electrical heating means associated with one of said thermally responsive elements to effect separation of said elements upon energization of the heating means, means for adjusting the position of one of said arms to vary the operation of the thermally responsive elements, a terminal electrically connected to the thermally responsive element having the heating means associated therewith, and a second terminal electrically connected with the heating means whereby a resistance unit may be detachably inserted between the terminals to vary the current passing through the heating means.

2. An electric circuit controller adapted to control current impulses in the circuit, said controller comprising a support, a pair of arms fixed at one end to the support and having freely movable portions, a pair of thermally responsive elements each secured to a different one of said arms by an end thereof engaging the arm movable portions whereby the thermally responsive elements may be bodily moved with the arms, each of said thermally responsive elements having a freely movable portion provided with an electric contact and the contacts being engageable to complete an electric circuit, means for adjusting the position of one of said arms to vary the operation of the contacts, the other arm being movable to effect engagement of the contacts, electrical heating means associated with one of said thermally responsive elements energizable to heat its associated element to effect separation of the contacts, a terminal electrically connected with the element having the heating means associated therewith, a second terminal electrically connected to the heating means, and a resistance unit detachably mounted between the terminals to vary the current passing through the heating means.

3. The controller as described in claim 2 and wherein a conductor extending upwardly is electrically connected to one of said terminals and the heating means, and an enclosing housing engageable with the support is provided with a contact engageable with the upstanding conductor to transmit current to the controller.

4. The controller as described in claim 2 and wherein an enclosing housing is provided engageable with the support, together with electrical conducting means accessible externally of the housing connected with one of said terminals and the heating means to transmit current to the controller.

LEONARD BODDY.